United States Patent [19]

Pyle

[11] 4,364,438

[45] *  Dec. 21, 1982

[54] DUAL TRACTOR ROAD GRADER WITH DOUBLE ARCHED CENTER FRAME

[76] Inventor: Donald L. Pyle, Rte. 2, Box 3180, Miles City, Mont. 59301

[ * ] Notice: The portion of the term of this patent subsequent to Jul. 21, 1998, has been disclaimed.

[21] Appl. No.: 254,716

[22] Filed: Apr. 16, 1981

Related U.S. Application Data

[63] Continuation-in-part of Ser. No. 25,155, Mar. 21, 1979, Pat. No. 4,279,312.

[51] Int. Cl.³ .............................................. E02F 3/76
[52] U.S. Cl. ................................... 172/789; 172/292; 180/235
[58] Field of Search ............... 172/292, 780, 781, 789, 172/791, 792, 793, 795, 796, 797, 799; 280/408, 442, 496; 296/190; 180/89.12, 235; D15/23, 30

[56] References Cited

U.S. PATENT DOCUMENTS

| | | | |
|---|---|---|---|
| D. 259,045 | 4/1981 | Mende | D15/30 |
| 3,672,460 | 6/1972 | Takata | 180/235 X |
| 3,933,216 | 1/1976 | Irwin | 180/89.12 X |
| 4,279,312 | 7/1981 | Pyle | 172/789 |

FOREIGN PATENT DOCUMENTS 7310311  1/1975  Netherlands ..................... 180/89.12

*Primary Examiner*—Richard T. Stouffer
*Attorney, Agent, or Firm*—Sughrue, Mion, Zinn, Macpeak & Seas

[57] ABSTRACT

A double arch center frame employs a depending center arch to mount by a ball and socket connection the leading end of a draw bar and yoke assembly. Bell cranks pivotably mounted to yoke plates borne by the arched center frame intermediate of the center arch and the rear arch have arms pivotably coupled to respective hydraulic lift cylinders disposed on opposite sides of the center frame and to a like member common to the bell cranks. A side shift hydraulic cylinder is pivotably connected at one end to one side of a subframe rotatably supporting a mold board assembly and at the other end to a link member intermediate of its pivot connections to a second arm of the bell crank members. The forward arched end of the center frame is articulated to a front single axle tractor for rotation about right angle, vertical and horizontal axes, and the rear arched end of the center frame is hinge connected to a rear single axle tractor for pivoting about a horizontal axis. Multiple hydraulic crab steering cylinders force angulation of the tandem wheel tractors relative to respective ends of the double arch center frame to move the unit selectively into laterally offset crab steering conditions for the dual tractors for soft ground grading. In a further embodiment, a cab is provided on the rear tractor. Also, the rear steering cylinder mounts are moved closer to the center of the cross bar and the king pin hinge joint brackets are advanced forward of the rear end of the center frame.

1 Claim, 11 Drawing Figures

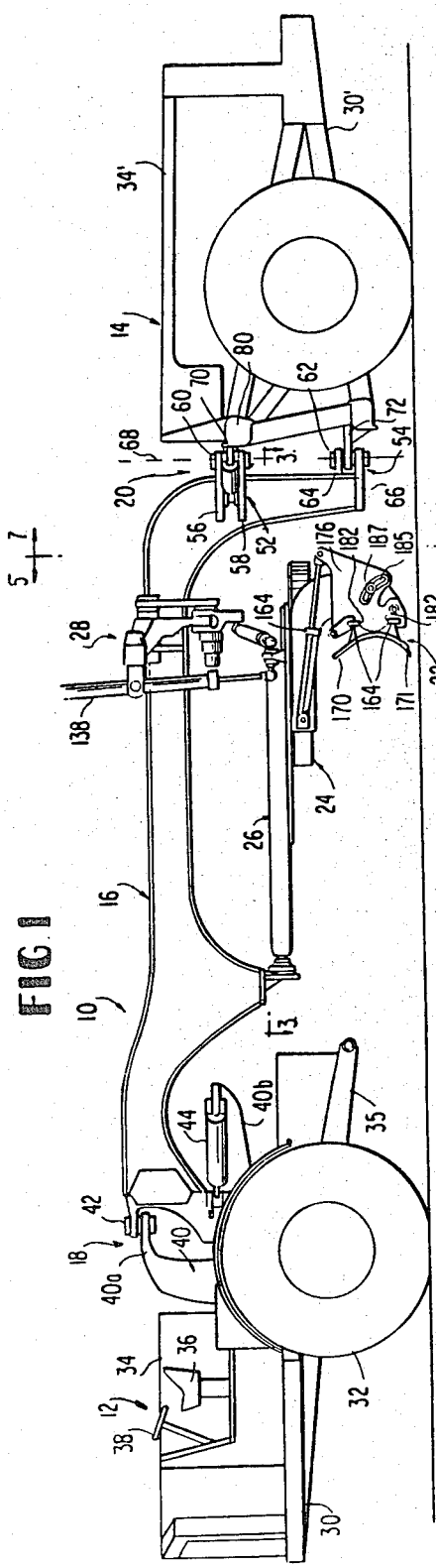
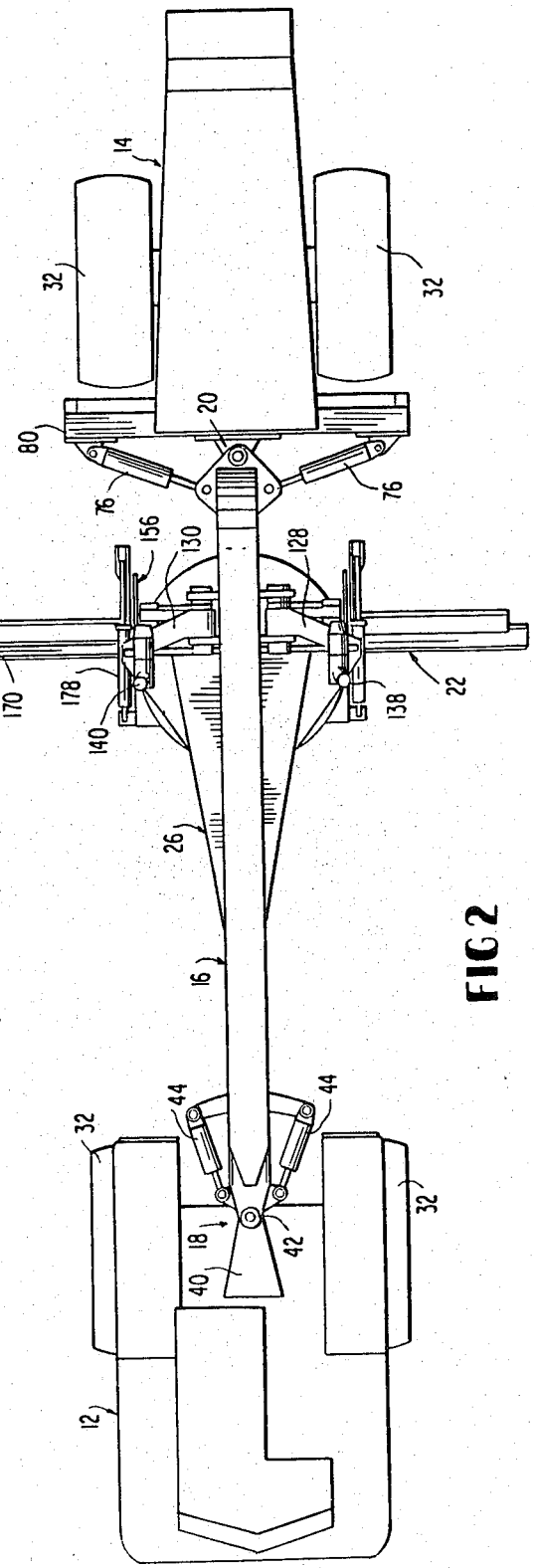
FIG. 1
FIG. 2

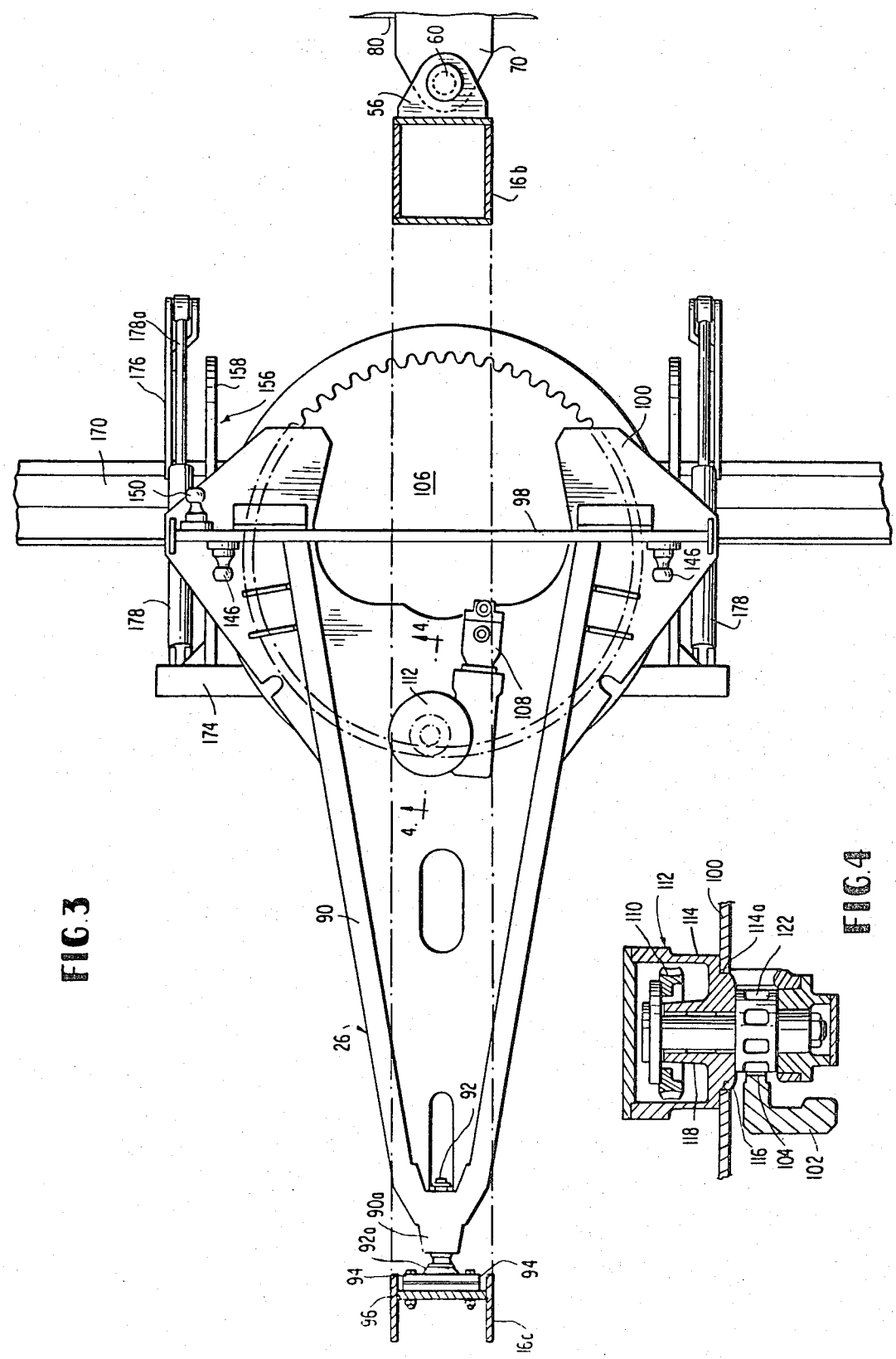

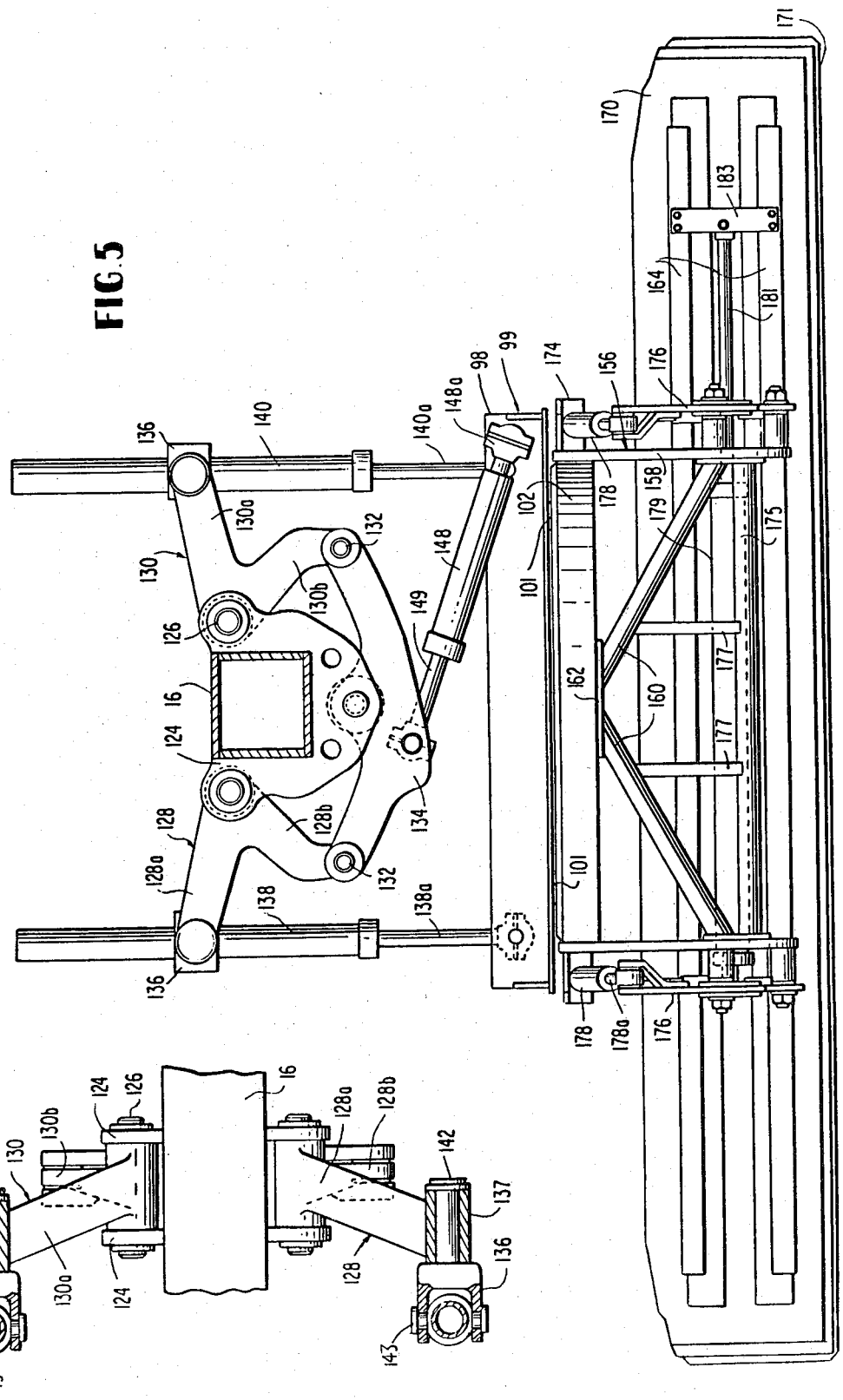

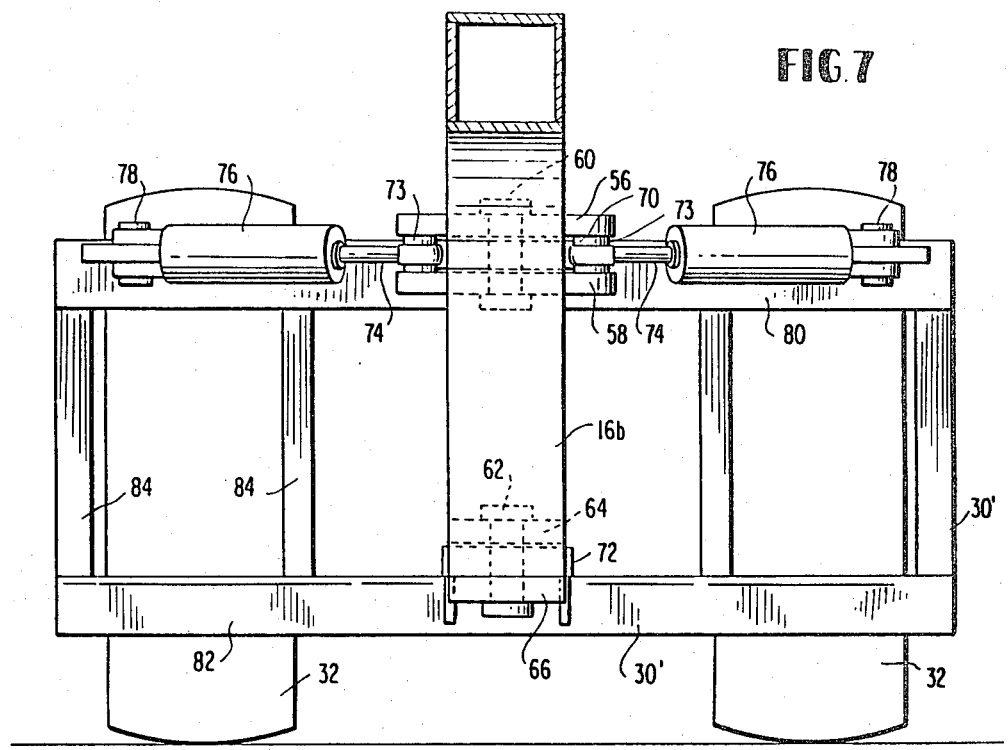
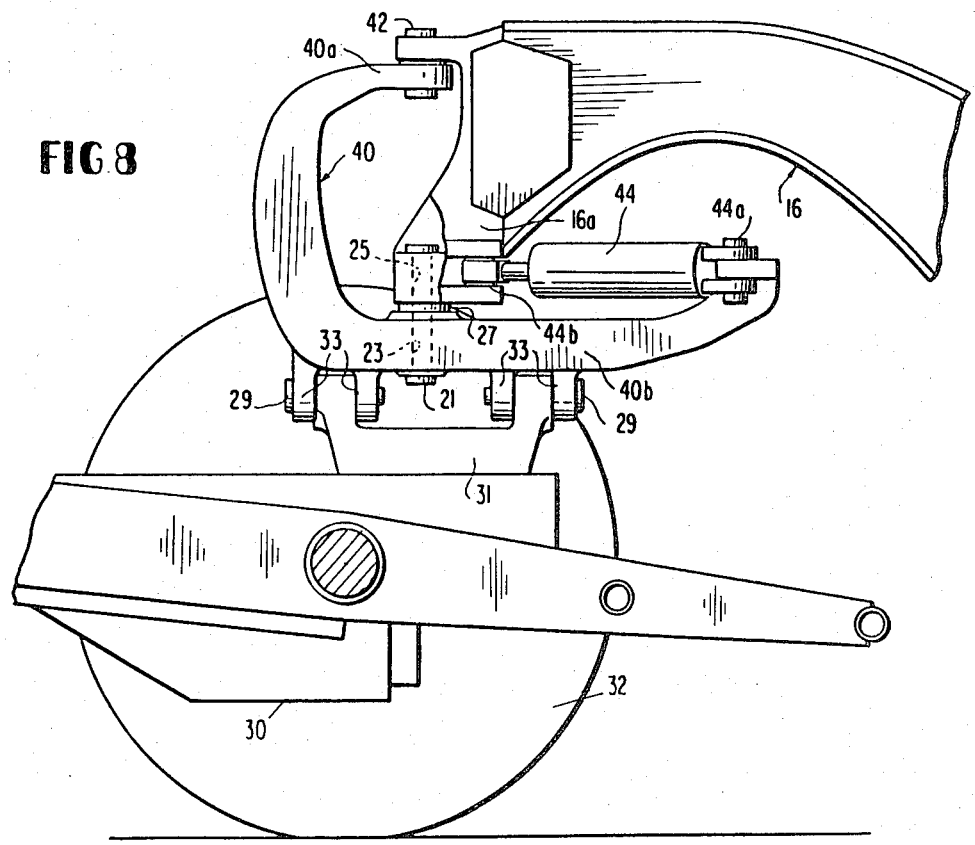

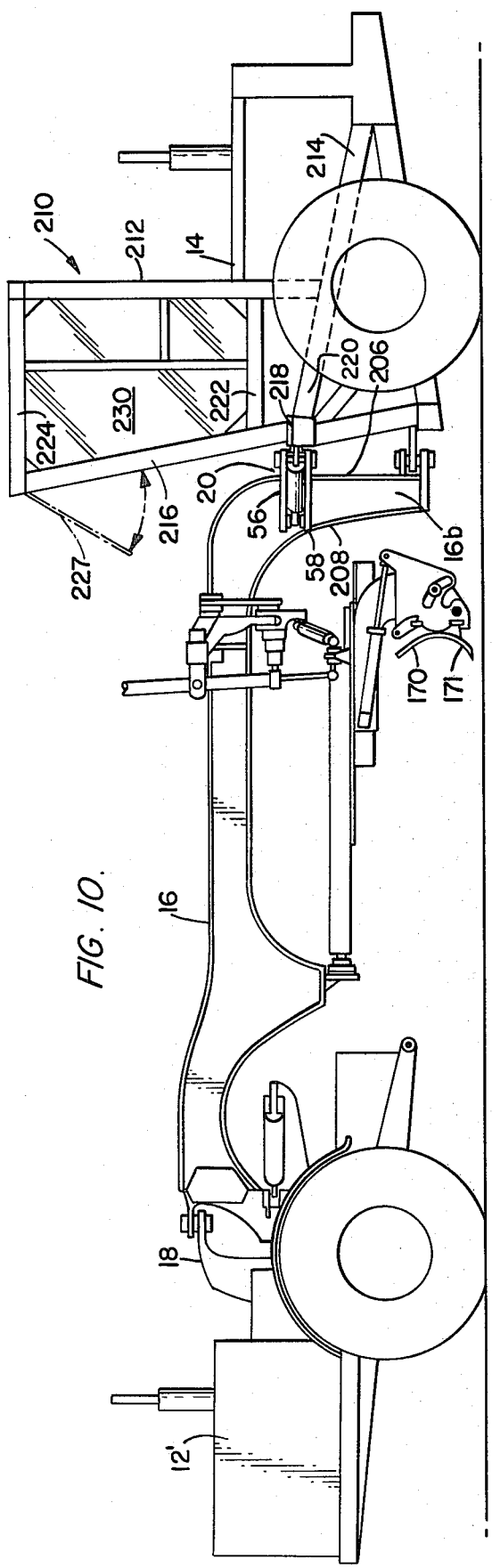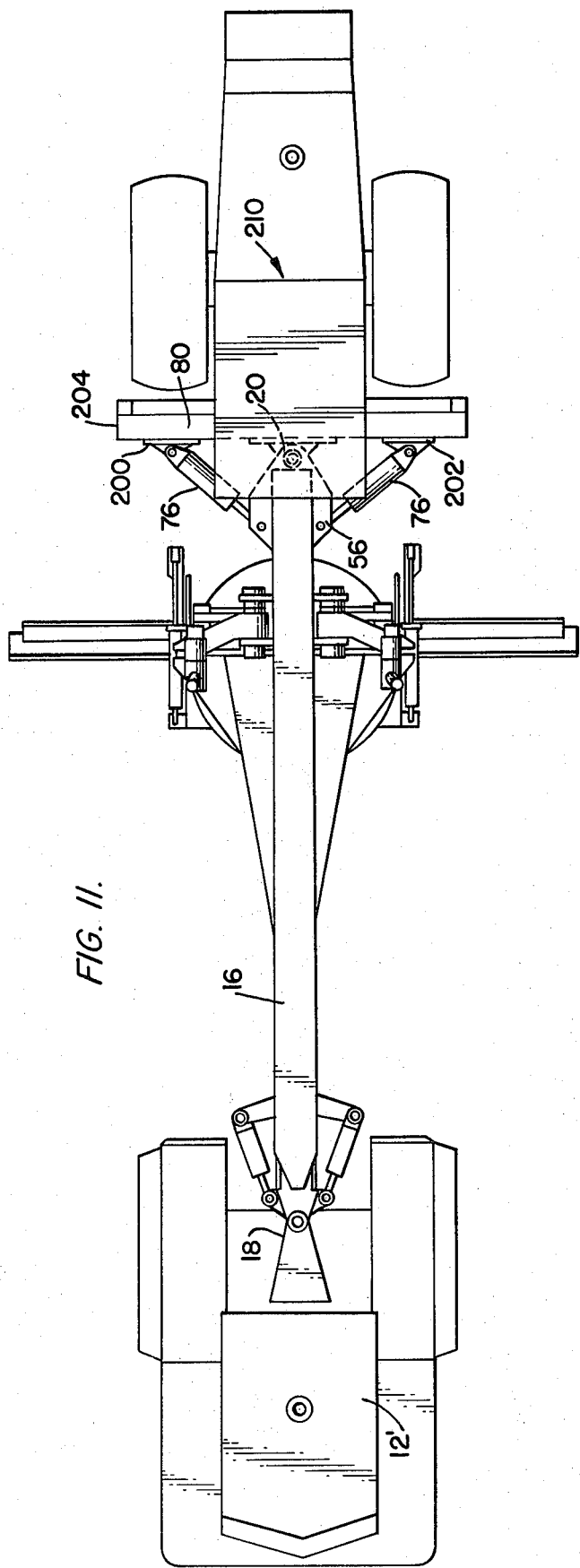
FIG. 10.
FIG. 11.

DUAL TRACTOR ROAD GRADER WITH DOUBLE ARCHED CENTER FRAME

This application is a continuation-in-part of application Ser. No. 25,155 filed Mar. 21, 1979, now U.S. Patent No. 4,279,312.

FIELD OF THE INVENTION

This invention relates to excavation apparatus employed in earth or material removal, and in particular, to a grader for performing intermediate surface contouring and finishing operation.

DESCRIPTION OF THE PRIOR ART

For several years, motor graders have been used as road maintenance machines and as contour finishing machines on earth moving projects. Early graders were pulled by a prime mover such as a wheeled or track-type tractor unit. The development of these machines has led to self-profelled models of increasing size horsepower. Most machines available today are driven by rear wheels, the front wheels being mainly employed for steering. Some later models offer articulated rear joints in addition to conventional steering axle. Such types of present machines are limited by the amount of power that can be transmitted by the rear wheels. As a result of this, most manufacturers try to incorporate a decided weight bias on the rear wheels in an effort to obtain maximum traction. Because of the weight bias on the rear wheels, conventional motor graders have difficulty in operating in soft ground. Either rutting of the finished surface occurs or the unit itself becomes stuck in the soft ground. Such machines are also, upon occasion, difficult to steer because of blade loading, weight distribution and the lack of power driving the steering wheels. Attempts have been made to build motor graders that have all wheel drive, but these machines have not been able to obtain the maneuverability and adequately position the blade at the same time.

In an effort to provide a motor grader to overcome the aforementioned problem, there is disclosed a U.S. Pat. No. 3,568,778 a type of earth working apparatus which comprises two similar mobile assemblies including drive engine and traction engine and which are reversely oriented, supporting a main frame therebetween, in an articulated suspension with the main frame carrying a subframe which in turn rotatably supports the mold board and blade for effecting the scraping of the surface being treated. The unit includes hydraulic cylinder operated mechanisms for adjusting the angle of attack of the blade, the angular position of the blade with respect to the longitudinal center line of the apparatus, and the tilt of the blade in the plane of its longitudinal axis. Further, the structure of U.S. Pat. No. 3,568,778 incorporates an operating cab which is mounted to the central or main frame and which is rotatable about a vertical axis in an attempt to gain optimum surveillance of the area of operation of the machine and to facilitate controlled operation of the machine from this vantage point.

While the motor grader of U.S. Pat. No. 3,568,778 provides a machine operating with improved precision and ease of handling, the apparatus itself is complicated in terms of proper positioning of the blade assembly and forms a center frame of bifurcated frames pivoted at their outboard ends to the front and rear mobile assemblies about a vertical axis and being pivotally coupled at their inboard ends to a central frame. Hydraulic cylinders carried by each of the bifurcated frames act on extension members from the frame centered member to independently angularly orient respective ends of the central frame relative to the transverse pivot axis for these members at the bifurcated ends of the bifurcated frames. This mechanism greatly increases the cost of the motor grader apparatus of U.S. Pat. No. 3,568,778 and renders the central frame assembly complex and unwieldly. It is, therefore, a primary object of the present invention to provide an improved dual tractor motor grader apparatus which provides improved maneuverability, superior weight distribution for the load subjected to the apparatus during earth grading, while simplifying the maneuverability and versatility in the positioning of the blade relative to the center frame articulated between the front end and rear end tractors.

Another object of the present invention is to provide a cab on the rear tractor having controls therein for controlling the entire operation of the machine. In addition, the rear steering cylinder mounts are moved inwardly toward the center of their supporting cross beam and the upward king pin hinge joint bracket members are advanced forwardly of the rear of the center frame.

It is a further object of the present invention to provide an improved dual tractor grader which provides improved, "crab" steering without interferring with blade positioning both in terms of angle of attack and angular blade positioning relative to the longitudinal center line of the apparatus center frame, and which insures superior performance of the grader on conventional surfaces and vastly superior performance when the grader is operating on soft ground.

SUMMARY OF THE INVENTION

This invention relates to an earth working apparatus of the type described in my co-pending application Ser. No. 25,155 filed Mar. 21, 1979, now U.S. Pat. No. 4,279,312, of which this is a continuation in part application. The invention employs a first single axle tractor and a second single axle tractor which are articulated to respective ends of an arched center frame. A draw bar and yoke assembly including a subframe is mounted to the center frame, underlying the same, with the subframe supporting a rotatable ring for rotation about an axis intersecting the plane of the draw bar and yoke assembly. A mold board assembly including a mold board and blade is carried by the rotatable ring for rotation with said ring. Means are provided for adjusting the angle of attack of the blade, the angle of inclination of the mold board about its longitudinal axis, the vertical lift position of the mold board and blade and the lateral position of the rotatable ring and subframe relative to the arched center frame. The improvement resides in the arched center frame comprising a double arch member including a depending center arch intermediate of the depending arches at respective ends. A ball and socket mount universally connects the leading end of the draw bar and yoke assembly to the center arch. Yoke plates fixed to the center frame, intermediate of the center arch and the arch articulated to the second tractor, overlies the draw bar and yoke assembly and bears bell cranks pivotably mounted to the yoke means on respective lateral sides of the center frame. The bell cranks include bifurcated arms with one arm pivotally coupled to one end of a corresponding hydraulic lift cylinder disposed on that side of the center frame and a second arm pivotally coupled to a link member common to the bell cranks, with the apex of the bell cranks being pivotably mounted to the yoke means. Means are provided for pivotably connecting the other end of the lift cylinders to the subframe on opposite sides of the center frame, and further means are provided for pivotally connecting a side shift hydraulic cylinder to said subframe at one side of the center frame and the other end of the hydraulic cylinder to the link member intermediate of its pivot connection to the second arms of the bell crank members. Extension and retraction of the hydraulic lift cylinders causes the subframe, the rotatable ring and the mold board assembly to be vertically raised or lowered, extending or retracting one of the hydraulic lift cylinders with respect to the other causes the mold board assembly to be tilted in the plane of the longitudinal axis of the mold board, and extension or retraction of the side shift hydraulic cylinder causes the subframe and the mold board assembly to be shifted laterally with respect to the longitudinal center line of the center frame.

The first tractor may comprise a generally L-shaped trunior including a vertical part at the rear of the first tractor and a horizontal part extending generally at right angles thereto and projecting rearwardly of the first part, said trunion being mounted to the first tractor for rotation about a general horizontal axis and including upper and lower king pins for pivotally connecting one arch end of the center frame to the trunion for rotation about a generally vertical axis. A first pair of hydraulic crab steering cylinders are pivotably connected at one end to the trunion horizontal part on opposite sides of the center frame and to the arched end of the center frame adjacent the king pin connection pivot point between the center frame and the trunion. The opposite arched end of the center frame is hinge connected to the second tractor by a hinge joint permitting pivoting of the second tractor relative to the center frame about a generally vertical axis. A second pair of crab steering hydraulic cylinders are respectively pivotably connected at respective ends to the center frame arched end adjacent the hinge joint on opposite sides thereof and to the second tractor means on opposite sides of the hinge joint connection between the second tractor means and the center frame such that extension and retraction action of the crab steering hydraulic cylinders effects angular orientation of the tractor means with respect to the center frame at respective ends thereof to cause the first tractor and the second tractor to move into laterally offset positions with respect to each other for crab steering under close control and insure fine grading by the blade regardless of direction of movement of the unit, angle of attack of the blade, angular position of the mold board and blade relative to the longitudinal axis of the center frame supporting the same.

Preferably, a mold board support assembly is fixed to the ring and depends therefrom and comprises laterally opposed support plates at right angles to the plane of the draw bar and yoke assembly. Mold board pivot plates are pivotably connected to opposed support plates, to the side thereof, for pivoting about an axis generally coplanar to the plane of the draw bar and yoke assembly. At least one blade attack angle adjustment hydraulic cylinder is pivotably connected at one end to said subframe and at its opposite end to a mold board pivot plate remote from the pivot point of the pivot axis of the mold board pivot plate to permit variance in angle of attack of the blade by relative extension and retraction action of the hydraulic cylinder. The mold board includes a pair of slide bars fixedly mounted thereto and slidably positioned within grooves provided along corresponding edges of said mold board pivot plate to permit the mold board assembly to slide transversely of the mold board support assembly. Hydraulic mold board lateral shift cylinder means is operatively mounted to the mold board assembly at one end and to the slide bars at the other end such that extension and retraction action of the hydraulic mold board lateral shift cylinder means causes the mold board and the scraper blade carried thereby to be shifted laterally relative to the axis of rotation of the ring member and the center of the subframe.

A further embodiment of the present invention contemplates the elimination of operator controls on the front tractor and the provision of a cab on the ear tractor from which the operator may control the entire operation of the machine and from which the operator may have total visibility over the movement of the mold board and blade.

BRIEF DESCRIPTION OF THE DRAWINGS

FIG. 1 is a side elevational view of the improved dual tractor motor grader apparatus of the present invention, in one form.

FIG. 2 is a top plan view of the grader of FIG. 1.

FIG. 3 is a top plan view of the draw bar and yoke assembly of the apparatus shown in FIGS. 1 and 2.

FIG. 4 is a vertical longitudinal sectional view of a portion of the apparatus of FIG. 3 taken about line IV—IV, showing the ring drive mechanism.

FIG. 5 is a vertical sectional view of a portion of the apparatus of FIG. 1 taken about line V—V.

FIG. 6 is a top plan view of a portion of the apparatus of FIG. 1 illustrating the mounting of the subframe to the center frame.

FIG. 7 is a vertical sectional view of a portion of the apparatus of FIG. 1 taken about line VII—VII.

FIG. 8 is an enlarged vertical, longitudinal sectional view showing the articulared joint between the center frame and the front tractor unit.

FIG. 10 is a side elevational view of a modified form of the improved dual tractor motor grader apparatus of the present invention wherein the front tractor controls have been eliminated and the rear tractor is provided with a cab from which the operator controls the entire operation of the apparatus.

FIG. 11 is a top plan view of the grader of FIG. 10.

DESCRIPTION OF THE PREFERRED EMBODIMENT

Figure 9:
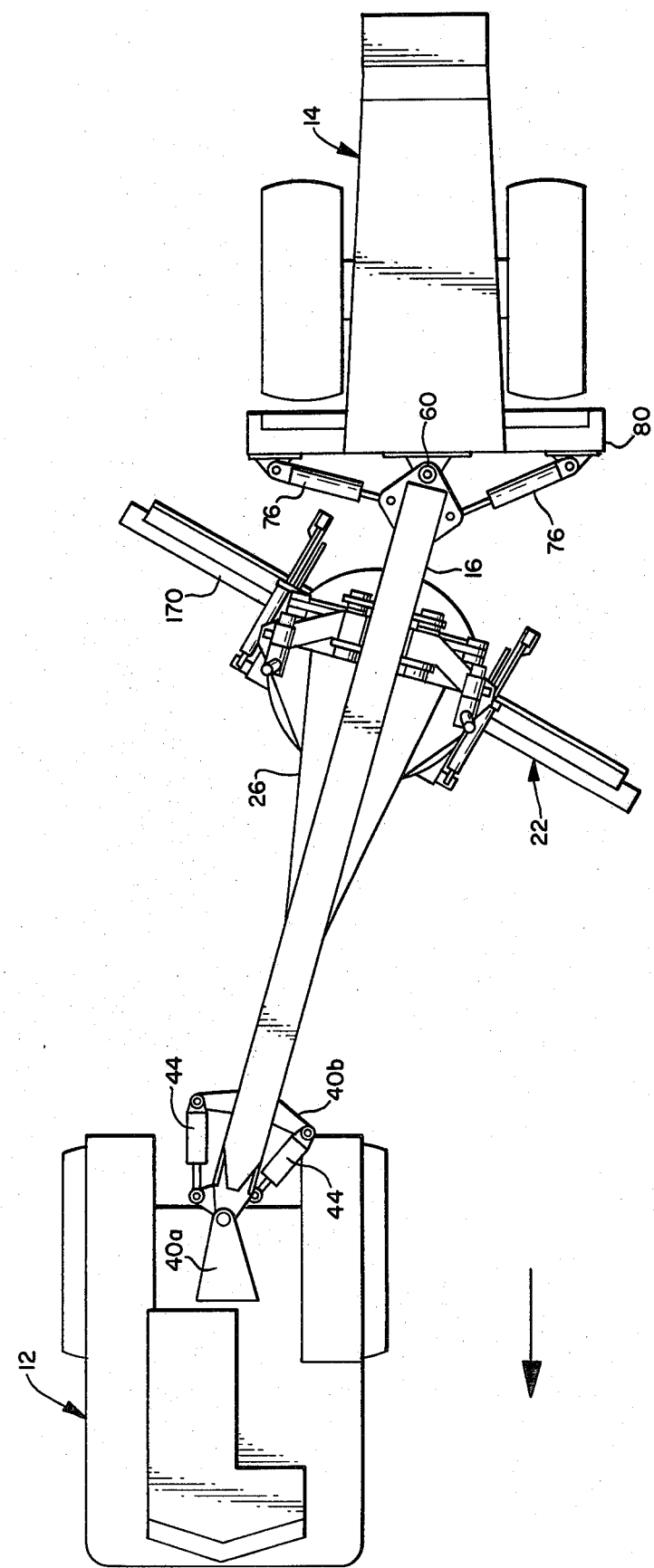
FIG. 9 is a top plan view of the apparatus of FIG. 1 in "crab" steering position.

Referring to the drawings, the improved, dual tractor motor grader or apparatus is indicated generally at 10 and comprises principally a front tractor unit indicated generally at 12, and oppositely oriented rear tractor unit indicated generally at 14, a double arch center frame indicated generally at 16 and being articulated to said front tractor unit by way of articulated joint indicated generally at 18 and being hinged for pivoting about a vertical axis through a vertical axis hinge joint indicated generally at 20. Further, the apparatus 10 further comprises, principally, a mold board assembly indicated generally at 22 mounted to and supported by a subframe indicated generally at 24 by way of a draw bar and yoke assembly indicated generally at 26 which is adjustably controlled by way of a blade positioning mechanism indicated generally at 28.

The front tractor unit consists of a chassis 30 supported by single axle as at 32 to each side of the chassis 30 which bears a power source as at 34. The unit may be driven and controlled from either of the tractors, but is here shown as being controlled by an operator seated upon the front seat at 36 and controlling the steering of the vehicle through a steering wheel as at 38. The power source 34 may include a suitable diesel or gasoline internal combustion engine as is conventional. The engines both for the front tractor unit 12 and the rear tractor unit 14 operate suitable hydraulic pumps and motors to both drive the units under positive traction and to control the various components in terms of their position and angular orientation as will be described hereinafter.

The rear tractor 14 may be a twin to the front tractor unit 12 or these two components may comprise the front and rear tractor units of a conventional tractor scraper such as a scraper under TEREX model designation TS-14 manufactured by the General Motors Corporation. However, the nature and make up of the center frame 16, the mold board assembly, its support and positioning and the articulation of the center frame both to the front tractor unit and the rear tractor unit are decidedly different from the TEREX TS-14 dual tractor scraper. The chassis 30 of the front tractor unit 12 supports a vertical steering trunion 40 including a vertical part 40a and rearwardly directed horizontal post 40b, and which is L-shaped and mounted to chassis 30 for pivoting about a horizontal axis. Trunion 40 bears an upper king pin 42 which pivotably mounts the leading end 16a of the center frame to the front tractor unit for pivoting about a vertical axis, this pivot acting in conjunction with a lower king pin 21.

Referring to FIG. 8, the articulated joint 18 between the forward end or arch 16a of the center frame 16 and the front tractor unit 12 may be more readily seen. In that respect, the forward end 16a of the center frame 16 bears the lower king pin 21 which extends through a vertical hole 23 formed within a horizontal part 40b of the trunion 40 and projects through a suitable vertical hole 25 within the lower portion of the front end 16a of the center frame 16. A suitable bearing plate or washer 27 is interposed between the center frame 16 and the trunion 40. The part 40a of the trunion 40 is bifurcated and acts to pivotably support one end of a pair of hydraulic crab steering cylinders 44 through their pin connections as at 44a via arms 46. The other end of each hydraulic cylinder 44 is pivotally connected to the forward arch 16a, on opposite sides of the center frame 16. Further, the chassis 30 is pivotably mounted to the trunion 40 through paired king pins 29 which project through drilled holes within yoke 31 and depending brackets 33 carried by the trunion 40, such that trunion 40 and center frame 16, at this point pivot about a horizontal axis. The wheels 32 are mounted to the frame by way of springs 35 bearing axle 37.

Extension and retraction action of hydraulic cylinders 44 causes the center frame 16 to pivot about the axis of the king pins 21 and 42 so as to shift the rear tractor unit 14 as well as the elements carried by the center frame 16, to the right or left of the center longitudinal line of the front tractor unit 12.

The double arch center frame 16 is essentially an elongated M-shaped member in vertical elevation terminating at its rear in a depending arch or rear end 16b. The center frame 16 is of square hollow plate construction for providing a large strength to mass ratio. The rear end 16b of the center frame 16 bears a series of horizontal bracket members or plates for partially defining an upper king pin hinge joint as at 52 and a lower king pin hinge joint 54. The joint 52 comprises paired plates 56 and 58 which extend rearwardly and which are welded or the like to the center frame 16 and which bear aligned holes through which project an upper king pin 60. The upper king pin 60 defines along with the lower king pin 62, mounted between an upper plate 64 and a lower plate 66, a vertical pivot axis 68 for the center frame relative to the rear tractor unit 14. The tractor unit 14 bears single axle as at 32, which may be identical to those of the front tractor unit 12, mounted to a chassis 30 which bears its own power unit 34 including a diesel or internal combustion engine. The chassis 34' is provided with upper and lower pin connecting bars as at 70 and 72, respectively, these bars being apertured and sized to receive the upper and lower king pins 60 and 62. For controlled angular orientation about the vertical axis 68 of the rear tractor unit 14 with respect to the center frame 16 at its rear end 16b, the brackets or plates 52 and 56 pivotably couple as at 73 at one end the projecting rods 74 of respective left and right hydraulic crab steering cylinders 76 whose opposite ends are pivotably connected as at 78 to a transverse beam or cross bar 80 which spans across the front end of the chassis 30' of the rear tractor unit 14. Thus, as the cylinders 76 are respectively operated hydraulically in retraction and expansion, in an opposite sense, the rear tractor unit 14 is required to angulate about the vertical axis 68. Thus, by power application, the dual tractor grader may be forced into "crab" steering orientation, where the rear tractor unit 14 does not track the front tractor unit 12, but is laterally shifted with respect thereto so that the wheels 32 of the two units will not pass over the same ground. This is particularly important where soft ground grading occurs.

As best seen in FIG. 7, the chassis 30' includes both an upper transverse beam or cross bar 80, at the level of the upper king pin 60, and a corresponding lower transverse beam or cross bar 82 acting as a mount for the bar 72 and being joined to the upper beam 80 by suitable vertical bars 84 which are welded at their upper and lower ends to respective beams 80 and 82 to define an open vertical framework. This chassis, therefore, facilitates the hinge connection between the rear tractor unit 14 and rear arch 16b of the center frame 16 with controlled angular orientation between these elements by extension and retraction of the hydraulic cylinders 76.

The draw bar and yoke assembly 26, FIGS. 1, 2, 3, comprises a bifurcated draw bar 90 which opens outwardly in a rearward direction from its forward end 90a which attaches by means of a draft bolt 92 bearing a ball 92a to a central arch 16c of the double arch center frame 16 by means of a cap 94 which surrounds the ball of the draw bolt 92 to form a ball and socket universal connection. The cap 92 is bolted to a plate 96 of the central arch 16c of the center frame 16. The bifurcated draw bar 90 is welded to a cross bar 98 at its open rear and which elements are in turn welded to or alternatively bolted to an underlying yoke 100, the yoke 100 and bifurcated draw bar 90 forming the principal elements of a subframe 99. The yoke 100 supports by bolts or other means a series of radially outwardly projecting, depending shoes 101, FIG. 5, in a semi-circular array which support a large metal ring or member 102, bearing teeth 104 on its inner periphery and defining an annular rack. The shoes support the ring 102 for rotation about its axis which extends through the open center 106 of the yoke 100. A hydraulic ring drive motor 108 is mounted to the upper face of yoke 100 in between the bifurcated portions of the draw bar 90 with the hydraulic motor 108 connected to a driven pinion gear 110, FIG. 4, borne by a vertical axis gear transmission unit indicated generally at 112 and comprised of a cylindrical casing 114 which is peripherally recessed at 114a on one end so as to fit within an opening 116 formed within the yoke 100. The casing 114 forms a large central sleeve bearing 118, supporting shaft 120 for rotation about its axis. The shaft 120 bears pinion gear 110 at one end above the yoke 100 and bears below the yoke 100, a drive pinion 122 which meshes with the annular rack 104 of ring 102. Operation of the hydraulic motor 108 acts to rotate the ring 102 a full 360° in either direction about its axis supported by the shoes 101. The function of ring 102 is to support the mold board assembly indicated generally at 22 for rotation about the ring axis.

Further, due to the ball and socket connection of the forward end of the draw bar 90, the subframe 99 is lifted vertically as well as tilted about the horizontal longitudinal center line of the center frame 16, while additionally, the subframe 99 and the components carried thereby including the mold board may be shifted sidewise relative to that longitudinal center line.

Referring next to FIG. 5, it may be seen that the double arch center frame 16 which preferably takes the form of a hollow rectangle has rigidly fixed thereto by way of welding or the like a pair of longitudinally spaced yoke or collar plates 124, FIGS. 5, 6, above subframe 99, the plates 124 mounting paired pivot pins 126 to respective sides of the center frame 16. Left and right bell cranks or members 128 and 130 are pivotably mounted at the apex of their arms 128a, 128b and 130a, 130b by way of the pins 126 to the yoke or collar plates 124, the bell cranks being V-shaped in configuration. The arms 128b and 130b are pin connected by way of pins 132 to a common link or member 134 which spans beneath the center frame 16. The bell crank member arms at 128a and 130a are double pivotably mounted by way of yokes 136 to left and right lift cylinders 138 and 140. The hydraulic lift cylinders 138 and 140 are mounted so that they may pivot about intersecting horizontal axes as defined by pins 142 which are born within bosses 138 at the outer ends of the bell crank arms 128b and 130and by pins 143 of the yokes 136. Further, the left cylinders 138 and 140 are provided with extendable and retractable rods 138a and 140a, respectively, which are pivotably connected to the subframe cross bar 98 by way of ball and socket connections through bosses 146 which project to one side of the cross bar 98 of the subframe 99. The bell crank members 128 and 130 act due to their connection by way of link 134 to facilitate the tilting of the subframe 99 and the mold board assembly 22 carried thereby about the longitudinal center line as defined by the center frame 16 between the front and rear tractor units regardless of whether these units are in turn longitudinally aligned or laterally offset and in a "crab" steering orientation.

Additionally, and very important to the present invention, is the connection between the subframe cross bar 98 and one end of a hydraulic blade side shift cylinder 148. A ball and socket connection 148a is effected at boss 150, FIG. 3, borne by cross bar 98 while rod 149 of that hydraulic cylinder 148 is pivotably connected to link 134 intermediate of its pivotable connections to the bell cranks 128 and 130. Extension and retraction action of rod 149 shifts the subframe 99 and all elements carried thereby laterally to the left or right relative to the center frame.

Turning next to the mold board assembly 22, the present invention features a mold board assembly wherein the mold board itself as at 170 bearing blade 171 is laterally shiftable with respect to the center of the mold board support assembly indicated at 156 which rigidly connects to ring member 102 so as to rotate therewith. In this respect, welded or otherwise affixed to opposite mold board sides of ring member 102 are modified inverted L-shaped support plates 158 which extend forwardly, and which are fixed to opposite ends of cross beam or cross bar 174. Diagonal reinforcing members 160 meet at a flat plate 162 to which they are welded at their inner ends with the plate being welded to the ring member. The opposite ends of the diagonal members 160 are fixed to respective plates 158 to define along with a lower cross beam or bar 175 and a pair of vertical intermediate support bars 177, the open frame work mold board support assembly 156. Further, this mold board support assembly 156 bears a hydraulic mold board lateral shift cylinder indicated at 179 which spans across the frame work beneath the ring member 102 and which carries an extensible and retractable rod 181. The rod 181 is fixed at its outboard end, by way of cross bar 183, to a pair of slide bars 164 which are parallel to each other and which are slidably mounted within notches or recesses 182 within edges of angularly adjustable mold board pivot plates 176. The mold board pivot plates 76 are pivoted at their lower ends by way of pivot pins 172 to support plates 158. Plates 176 include arcuate slots as at 185 through which project a threaded bolt 187 having one end fixed to the adjacent plate 158 and bear nuts 180 on their opposite end such that once positioned, by torquing the nuts 180, the arcuate position of the mold board 170 may be secured providing a desired blade tip attack angle to blade 171. The mold board 170 is fixed to the slide bars 164 so as to slide therewith, permitting the mold board and the blade to be shifted laterally relative to the axis of rotation of the mold board support assembly 156 and the ring member 102. Arcuate positioning and variation in the angle of attack of the blade 171 is effected by means of blade tip angle control hydraulic cylinders 178 mounted to each side of the mold board support assembly 156.

Specifically, one end of each cylinder 179 is pivotably connected to the cross bar 174 outboard of its plate 158, while the projecting end of the cylinder rod 178a is pivotably connected to its pivot plate 175 remote from the pivot axis of that plate.

The hydraulic lines leading to and from the double action hydraulic cylinders have purposely been eliminated from the drawings to more clearly show the hydraulic cylinders and the mechanisms they control. However, the gasoline or diesel engine power source for providing the power necessary to propel the grader and to effect change in orientation and positioning of the various elements includes a source of hydraulic fluid, a pump and the controls for the hydraulic cylinders, all of which are fully conventional and preferably located within the front tractor 12 although this could optionally be on the rear unit with suitable part reversal. However, duplicate internal combustion engine power means pump, hydraulic fluid source and controls may be provided to the rear tractor unit 14 including a steering mechanism such that the unit may be driven forwards or backwards, at will, without the necessity for movement of the grader relative to the earth formation being worked other than orientation of blade 171.

Further, since the mold board assembly 22 can be rotated a full 360°, the blade angle of attack may be readily varied, the side inclination or tilt of the blade may be changed, the mold board and blade itself may be shifted transversely through the axis of rotation defined by the ring 102, it is evident that the machine is simply constructed but highly versatile. In operation, power may be supplied by either or both of the power tractor units 12 or 14. Because of the articulated joint 18, the center frame 16 may be inclined relative to the vertical plane of the front tractor unit, and the center frame may be pivoted by energization of hydraulic cylinders 44 and/or 76, FIG. 9, which will have the effect of causing the tractor units or the mold board assembly 22 and tractor units to be shifted transversely to the right or left relative to each other. By operation of the hydraulic cylinders 44 and 76, the center frame may be pivoted relative to the longitudinal axis of the front and rear tractor units. This may be achieved without change of either the angle of attack of the blade 171 (and the mold board 170), the angle of inclination of the mold board assembly 22 transversely through the axis of rotation of ring 102, the angular position of the mold board and blade by rotation of the ring 102 about its axis or the lateral position of the mold board and the blade by operation of hydraulic cylinder 179. Extremely close control in the maintenance of attitude of the mold board assembly and the blade is achieved as well as superior positioning of the tractor units, particularly where they are laterally offset or in "crab" steering orientation.

A further embodiment of the invention is shown in FIGS. 10 and 11 wherein the front engine 12' replaces the front tractor 12 and the double arch center frame 16 is articulated to the front engine by way of an articulated joint 18. The opposite end of the frame 16 is pivotable to the rear tractor 14 about a vertical axis through a vertical axis hinged joint 20.

The articulated joint 18 is identical to that shown in FIGS. 1, 2 and 8 and no additional description is deemed necessary to an understanding of this embodiment.

The mounting plates 200 and 202 for the steering cylinders 76 are secured to the cross bar 80 inward of the ends 204. The positioning of the mounting brackets 202 and 204 inward toward the center of the bar 80 will require the repositioning of the bracket plates 56 and 58 forward of the rear 206 of rear end 16b. This is accomplished by extending or enlarging plates 56 and 58 to a point near the inner end 208 of the rear end 16b. Repositioning of the cylinder mounts, cylinders and cylinder bracket plates in this fashion is advantageous in that the operator will have better visibility of the mold board 170 and blade 171 when they are angled backward in the extreme position.

To further aid in providing better visibility for the operator, a cap 210 is provided on the rear tractor 14. The cap 210 has rear vertical posts 212 (one shown) which are supported on a downwardly inclined beam 214. Front forwardly inclined vertical posts 216 (one shown) are secured to plates 218 supported on the ends 220 of the beam 214. The front and rear posts are spaced apart by horizontal bars or beams 222 and 224 (one each shown). A suitable opening or door 226 provides access to the cab and a front window 227 is pivotable outwardly so as to permit additional air to enter the cab. Controls for the front engine, rear tractor and steering mechanisms are arranged within the cab whereby the operator may control the operation of the apparatus with the greatest possible ease and visibility.

While the invention has been particularly shown and described with reference to a preferred embodiment thereof, it will be understood by those skilled in the art that various changes in form and details may be made therein without departing from the spirit and scope of the invention.

What I claim is:

1. An earth working apparatus comprising:
   a single axle engine means,
   a single axle tractor means,
   a double arched center frame articulated at one end thereof to said engine means and at the other end thereof to said tractor means,
   a draw bar and yoke assembly including a subframe mounted to said center frame, said subframe supporting a rotatable subframe ring for rotation about an axis intersecting the plane of said draw bar and yoke assembly,
   a mold board assembly including a mold board and blade carried by said rotatable ring and means for adjusting the angle of attack of said blade, the angle of inclination of the longitudinal axis of said mold board, the vertical lift position of the mold board and blade, and lateral position of the mold board and blade, and lateral position of the rotatable subframe ring relative to the arched center frame,
   the improvement wherein:
   said double arched center frame comprising a first arcuate underportion, a second arcuate underportion spaced longitudinally from said first arcuate underportion, said first arcuate underportion including a first depending leg and a second depending leg, said second arcuate underportion including a third depending leg and a fourth depending leg, said second depending leg and said third depending leg defining therebetween a depending center common leg of said double arched center frame,
   a ball and socket mount connecting the leading end of said draw bar and the yoke assembly to said depending center common leg of said double arched center frame.
   a pair of longitudinally spaced yoke plates affixed to said center frame intermediate of said center common leg and said other end of said arched center frame,
   bell cranks pivotably mounted to said spaced yoke plates on respective lateral sides of said center frame and each including a first arm doubly pivotably coupled to one end of a corresponding hydraulic lift cylinder for pivotal movement about intersecting horizontal axes, each lift cylinder disposed on a respective side of said center frame and a second arm at an angle to said first arm and pivotably coupled to a link member common to said bell cranks,
   means for pivotably connecting the other end of said lift cylinders to said rotatable subframe ring on opposite sides of said center frame,
   means for pivotably connecting one end of a side shift hydraulic cylinder to said subframe at one side of said center frame and at the other end to said link member intermediate of its pivot connections to the second arms of said bell crank members, such that extension and retraction action of said hydraulic lift cylinders causes said subframe, said rotatable ring and said mold board assembly to be vertically raised or lowered, extending or retracting one of said hydraulic lift cylinders with respect to the other, causes said mold board assembly to be tilted in the plane of the longitudinal axis of the mold board and extension or retraction action of said side shift hydraulic cylinder causes said subframe and said mold board assembly to be shifted laterally with respect to the longitudinal center line of said center frame, a first pair of hydraulic crab steering cylinders are respectively pivotably connected to the single axle engine means and to the arched end of said center frame, a second pair of hydraulic crab steering cylinders are respectively pivotably connected at respective ends to said center frame arched end adjacent the inner end thereof and to the tractor means toward the center thereof such that extension and retraction action of said hydraulic crab steering cylinders effects angular orientation of said engine and said tractor means with respect to said center frame at respective ends thereof to cause said engine means and said tractor means to move into laterally offset position with respect to each other and into crab steering position, and a cab supported on inclined beams on said tractor means whereby an operator may control the operation of the apparatus and view the mold board and blade when they are angled backward in the extreme position.

* * * * *